(No Model.) 2 Sheets—Sheet 1.
T. HILL.
DUMPING WAGON.
No. 372,470. Patented Nov. 1, 1887.
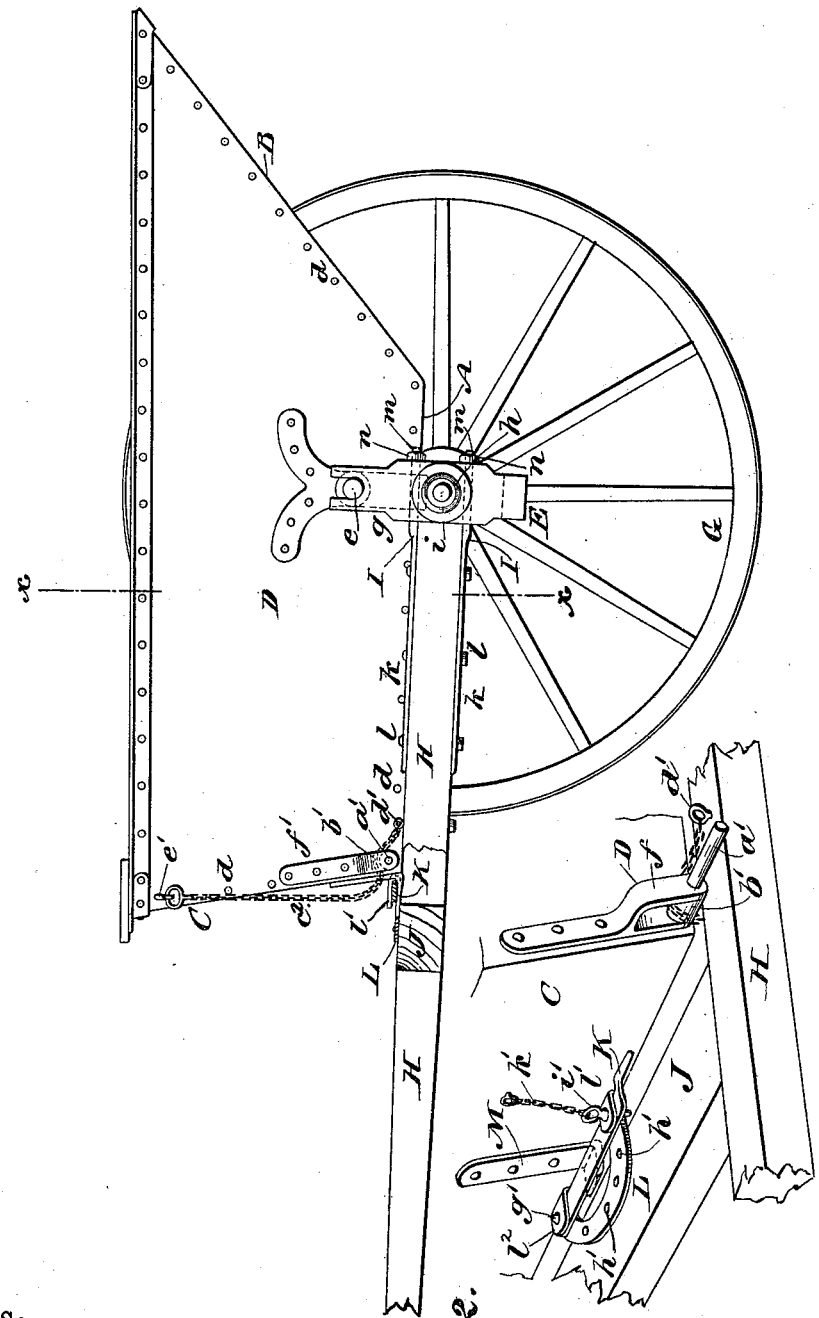
WITNESSES:
INVENTOR:
T. Hill
BY Munn & Co.
ATTORNEYS.

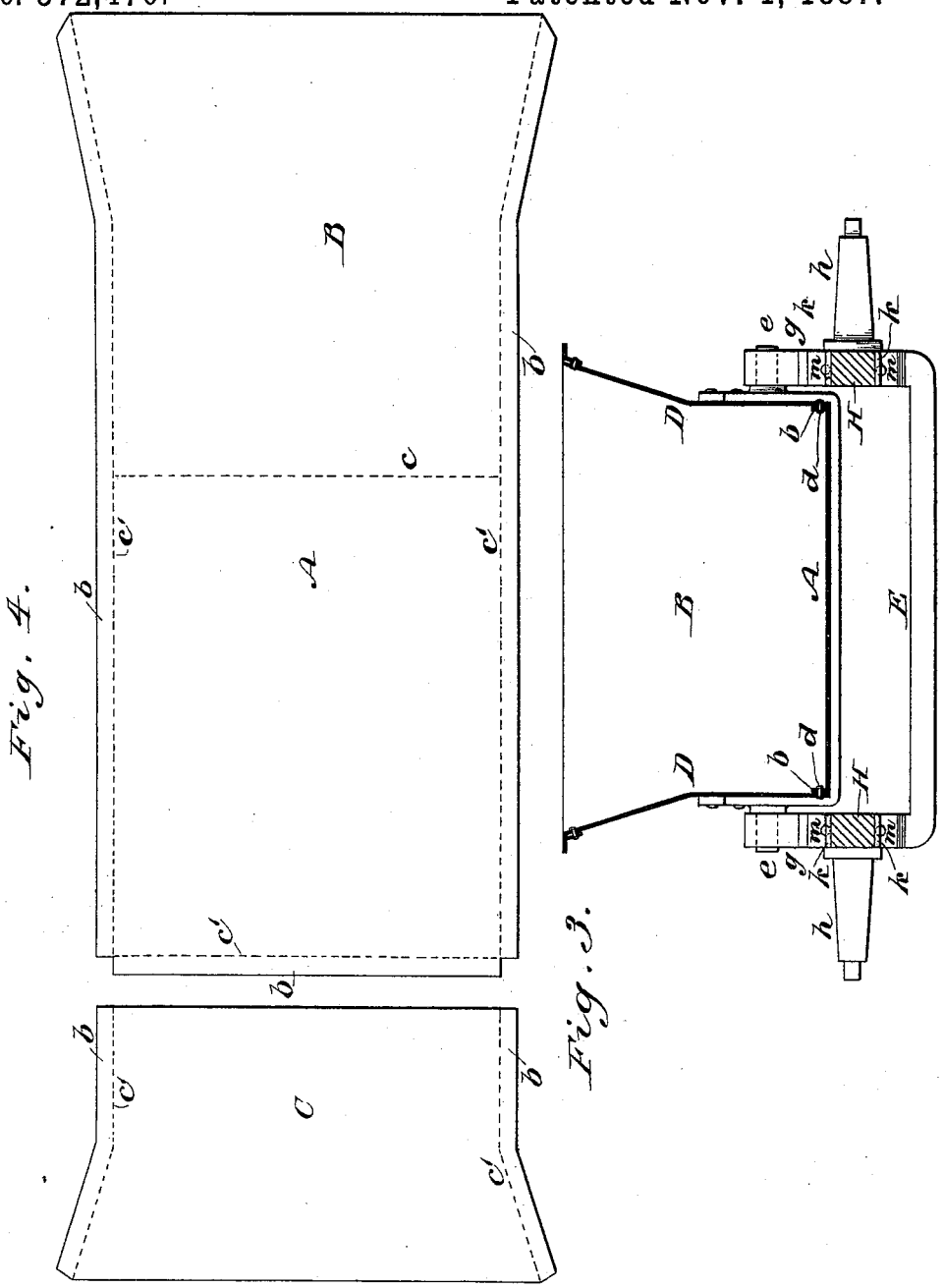

UNITED STATES PATENT OFFICE.

THOMAS HILL, OF JERSEY CITY, NEW JERSEY.

DUMPING-WAGON.

SPECIFICATION forming part of Letters Patent No. 372,470, dated November 1, 1887.

Application filed January 26, 1887. Serial No. 225,553. (No model.)

*To all whom it may concern:*

Be it known that I, THOMAS HILL, of Jersey City, in the county of Hudson and State of New Jersey, have invented new and useful Improvements in Dumping Carts or Wagons, of which the following is a full, clear, and exact description.

My invention relates to improvements in dumping carts or wagons for common road and other like use, and provided with shafts to adapt them to horse or cattle draft, and the bodies of which are supported by side pivots or journals to provide for the tilting of them; and it consists in peculiar constructions and combinations of certain parts, all as hereinafter described, and pointed out in the claims.

Reference is to be had to the accompanying drawings, forming a part of this specification, in which similar letters of reference indicate corresponding parts in all the figures.

Figure 1 represents a side elevation of a dumping-cart embodying my invention, with one of the wheels of the vehicle removed and with its shafts broken away. Fig. 2 is a view in perspective of the front end portion of the cart in part, looking cornerwise toward the front thereof. Fig. 3 is a vertical section, in part upon the line $x\ x$ in Fig. 1; and Fig. 4, a diagram showing the blanks from which the front end portion and bottom and back of the body of the vehicle are made.

The body of the vehicle is constructed of sheet metal, and composed of a bottom, A, and sloping back B, made all in one piece, a separate front end, C, and separate sides D D. Instead of uniting these parts by angle-iron arranged within the body, as heretofore, and riveted to said parts, which is not only expensive, but adds objectionable weight to the vehicle, I dispense with the angle-iron and secure such parts to each other direct—as, for instance, by making the bottom A and sloping back B out of one plate or sheet of metal, with a border or flange extension, $b$, on the sides and forward end of the plate, and the front end plate, C, with like side border or flange extensions, $b$, as shown in Fig. 4, and after the bottom and back plate has been bent on the dotted line $c$, same figure, and the flange portions $b$ bent, as on the lines $c'$, to form inwardly-bent flanges, as shown, for the bottom and back plate in Fig. 3, the several plates composing the bottom and back, sides, and front end of the vehicle are permanently secured to each other direct by rivets $d$, passing through the side plates, D, and flanges $b$.

The body of the vehicle is hung by pivots or trunnions $e\ e$, fast on a body-frame, $f$, in slotted or recessed bearings or upright $g\ g$, as usual, to provide for the tilting of the body when dumping. These uprights or bearings $g$ are shown as forming part of the axle E, which is a cranked one, and is provided or fitted with arms $h\ h$, upon which the wheels G of the vehicle, one of which only is here shown, run.

The shafts H H of the vehicle are finished at their rear ends to have a flat or solid bearing, as at $i$, against the faces of the uprights $g\ g$, and are firmly secured to said uprights by strap screw-bolts I I, the strap portions $k$ of which are fastened to the upper and under sides of the shafts by rivets or bolts $l$, while the screw-bolt portions $m$ pass through apertures in said uprights $g$ and are secured at their rear ends by nuts $n$. This constitutes a very firm and simple mode of attaching the shafts and of building the frame which carries the body of the vehicle. A cross-beam, J, serves to unite and brace the shafts in front of the body of the vehicle.

The body of the vehicle is fitted, as usual, with a side front handle, $a'$, for controlling it when being tilted; but the manipulation of said body, both when being tilted and when its front is being lowered again to its normal position, is greatly facilitated by providing said handle with a pulley, $b'$, over which a chain, $c^2$, attached, as at $d'$, to one of the shafts H, passes, and, when not being used to control the raising or lowering of the vehicle-body, is continued up to engage with a hook, $e'$, on the upper portion of the body. By disengaging said chain, however, from the hook $e'$, then the chain is free to be used for controlling the manipulation of the vehicle-body, the pulley or roller $b'$, which works within a bracket, $f'$, fastened to said body, securing a much easier and controllable action for the chain than if it simply passed through a fixed eye or over an immovable projection, which would induce excessive friction when pulling on the chain.

When the body of the vehicle is down in its normal position, as shown in Fig. 1, it is held or locked down by a very simple and convenient fastening. Thus K is a lever-handle, pivoted, as at $g'$, to a supporting-plate, L, which is permanently secured, as by screws or other fastenings, $h'$, to the cross-beam J between the shafts. This lever K closes up against or near the front of the vehicle-body and over a stepped or lipped catch, M, fast on said front, to lock or hold the body down, and the lever K is then locked in its closed position by a fastening-pin, $i'$, which may be attached by a chain, $k'$, to the vehicle-body, and which passes through an upper overturned end, $l'$, of the plate L and through the lever or handle K. A similar overturned end, $l^2$, at the other end of the plate L serves to form a slotted bearing for the pivoted end of the lever K, and the two overturned ends $l'$ $l^2$ of the plate L relieve the lever of strain when in lock. Upon drawing out the pin $i'$, then the lever K may be moved forward from under the overturned end $l'$ and from off the lip or bent lower end of the catch M, when the body of the vehicle may be manipulated or tilted, as required.

Having thus described my invention, what I claim as new, and desire to secure by Letters Patent, is—

1. The combination, with the axle of the vehicle and its side uprights, $g$ $g$, forming bearings for the body of the vehicle, of the shafts H H, constructed at their rear ends to butt or bear against said uprights, and the strap screw-bolts I I, secured on and along the shafts H H, arranged to pass through apertures in the axle-uprights $g$ $g$, and further secured to said uprights in their rear, essentially as shown and described.

2. In a dumping cart or vehicle, the combination, with the tilting body, its frame or support, and handle $a'$ on said body, of the pulley $b'$ and the chain $c^2$, adapted to control the manipulation of the body, substantially as specified.

3. In a holding-down fastening for the tilting body of dumping carts or vehicles, the fixed plate L, having overturned ends $l'$ $l^2$, in combination with the lever K, carried by said plate, substantially as shown and described.

THOMAS HILL.

Witnesses:
C. SEDGWICK,
E. M. CLARK.